UNITED STATES PATENT OFFICE.

JACOB W. WACHTER, OF WASHINGTON, DISTRICT OF COLUMBIA.

ADHESIVE AND PROCESS OF MAKING SAME.

SPECIFICATION forming part of Letters Patent No. 634,047, dated October 3, 1899.

Application filed March 17, 1899. Serial No. 709,508. (No specimens.)

*To all whom it may concern:*

Be it known that I, JACOB W. WACHTER, a citizen of the United States, residing at Washington, in the District of Columbia, have invented certain new and useful Improvements in Adhesive Compounds and Processes of Making Same; and I do declare the following to be a full, clear, and exact description of the invention, such as will enable others skilled in the art to which it appertains to make and use the same.

My invention consists, first, in the combination of an acidulated liquid, as vinegar, with glue, flour, turpentine, and gum-arabic, and, second, in the process by which these ingredients are compounded.

In making one hundred parts of this cement I use, approximately, vinegar, forty-eight parts; glue, thirty-four parts; flour, seven parts; turpentine, six parts; gum-arabic, five parts; total, one hundred parts. The process of compounding these ingredients is as follows, viz: Put the glue into approximately one-fourth part of the vinegar and boil it slowly for about ten hours. Boil the flour in the balance of the vinegar about twenty minutes, or until they are well united. In this part of the process the flour is converted into dextrine. Strain and add this to the glue solution. Then add the turpentine and gum-arabic and boil all together for about four hours, keeping the mixture well stirred. It is then ready for use.

This is a superior adhesive for uniting rough or polished vitreous and metallic surfaces, as well as all fibrous and porous substances. As a friction-dressing for belts and pulleys it is especially effective.

What I claim, and desire to secure, is—

1. The herein-described adhesive compound consisting of vinegar, glue, dextrine, turpentine and gum, in approximately the proportions specified.

2. The herein-described process of compounding the ingredients of this adhesive by slowly boiling the glue in a part of the vinegar for about ten hours, by boiling the flour in the remainder of the vinegar, straining the latter and adding it, with the turpentine and gum, to the glue solution, and boiling all together for about four hours more, keeping the mixture well stirred.

In testimony whereof I affix my signature in presence of two witnesses.

JACOB W. WACHTER.

Witnesses:
HENRY T. BRIGHT,
MARY M. PHELPS.